UNITED STATES PATENT OFFICE.

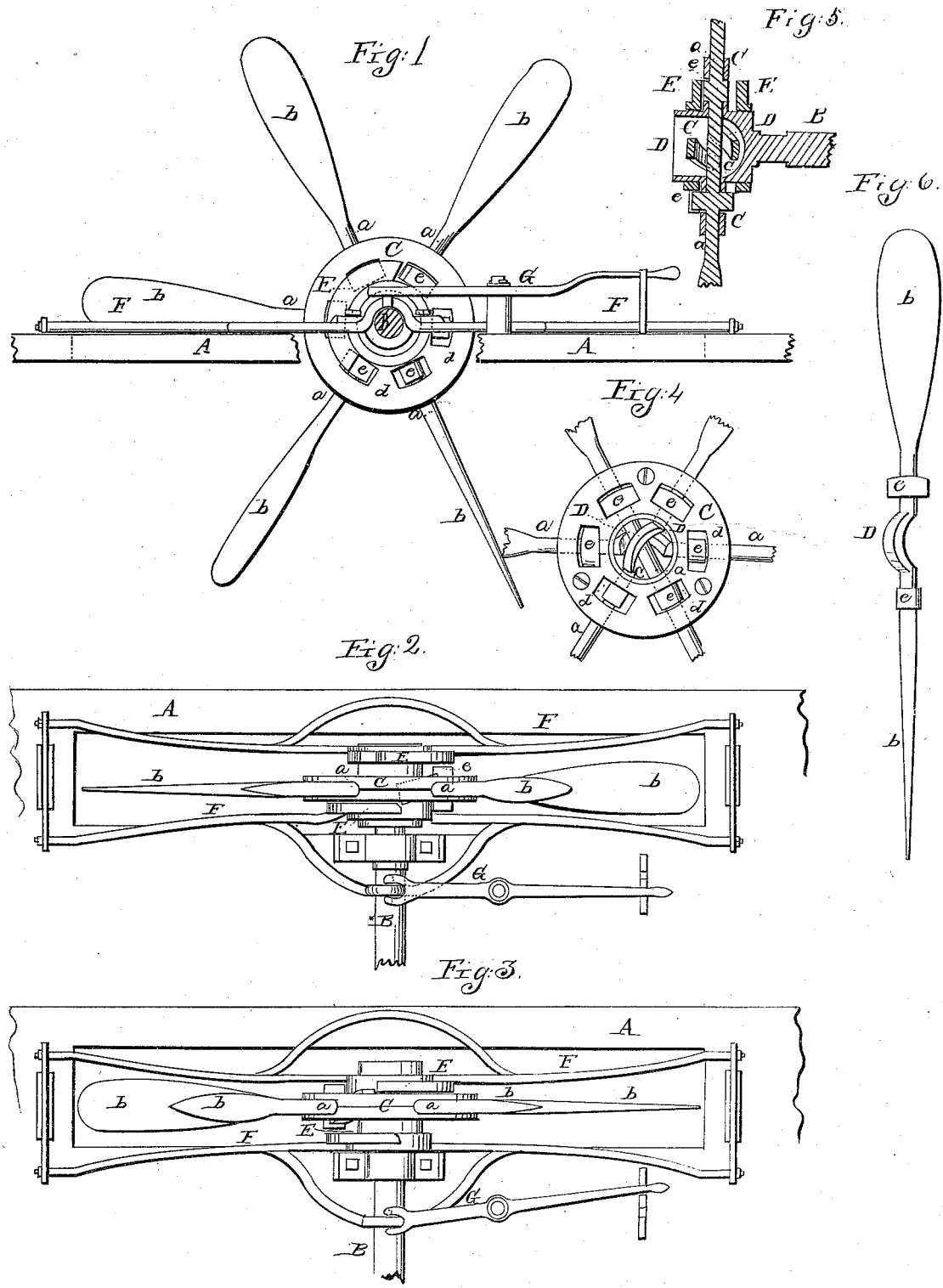

THOMAS CHAMPION AND SAMUEL CHAMPION, OF WASHINGTON, DISTRICT OF COLUMBIA.

IMPROVEMENT IN FEATHERING PADDLE-WHEELS.

Specification forming part of Letters Patent No. 11,031, dated June 6, 1854.

*To all whom it may concern:*

Be it known that we, THOMAS CHAMPION and SAMUEL CHAMPION, of the city and county of Washington, in the District of Columbia, have invented certain new and useful Improvements in the Construction of Paddle-Wheels for Propelling Vessels; and we do hereby declare that the following is a full, clear, and exact description of the construction thereof, reference being had to the annexed drawings, which make part of this specification, and to the figures and letters of reference marked thereon, and in which—

Figure 1 represents an elevation of a paddle-wheel embracing our improvement. Fig. 2 represents a plan thereof. Fig. 3 represents a similar view, but with the shifting-frame in a different position from that shown in Fig. 2. Fig. 4 represents an elevation of the hub of the wheel, showing the construction of the shanks of the paddles, whereby they are arranged in the same transverse line and passed through the hub. Fig. 5 represents a sectional view of the same, taken through the axis of the wheel. Fig. 6 represents a view of one of the paddles, showing its arched or bowed shank.

The nature of our invention consists in the bowing or arching of the shanks within the interior of the hub, or so many of them as may be necessary, so as to secure the many advantages of the solid or connected shanks through the hub with the double blades standing at right angles with each other and at the same time allow them to turn to feather the blades, in connection with the compactness and utility of having the paddles all arranged in the same transverse line in the hub or socket flanges, and also in a guide for reversing the feathering of the paddles whenever the motion of the wheel is reversed by a very small movement in the direction of the axis or shaft, instead of, as has been done, by turning the frame of the guides around the wheel beyond the extremities of the blades.

The object of arching the shanks of the paddles, it will be seen, is to enable them to be passed entirely through the hub and in the same transverse line, thereby greatly reducing the amount of turning and friction in feathering the blades, for when two blades are connected to the opposite extremity of the same shank at right angles, as we have arranged them, the motion and amount of friction in feathering the paddles are one-half less than when the paddles are arranged and connected to separate shanks which do not pass through the hub, and consequently not permanently at right angles.

A in the accompanying drawings represents the guard of the vessel, on which the wheel is supported.

B is the shaft of the wheel.

C is the hub or socket flanges in which the shanks $a$ of the blades $b$ are confined. This hub has an opening $c$ in its center for the purpose of receiving the bows of the shanks and allowing them to vibrate within it and other openings between the center and periphery to receive the projections on the shanks and to turn in as they successively strike the shifting-guide. This hub C is composed of two disks bolted together and mounted upon the end of the shaft, so that the shaft does not pass through the hub to interfere with the shanks of the blades; but in case it is found necessary each of the disks may be mounted on the end of a separate shaft, so as to leave the space in the center of the hub free to receive the shanks and allow the cranks to turn therein. In thus arranging the shanks through the hub one of them must be straight and the others arched on opposite sides of the straight shank, as represented in the drawings.

D is the arched, bowed, or cranked part of the shank, whereby the shanks can pass through the hub and embrace a straight shank and turn on their axis without interfering with each other during the feathering of the paddles.

E are the guides for reversing the motion of the paddles when it is desirable to turn the wheel in an opposite direction by a short and convenient side motion of the guides. They are arranged on each side of the hub C.

F is the frame of the guides, extending from the guides beyond the circumference of the wheel and connected by bars at the ends beyond the paddles, so that when one is thrown in gear the other is thrown out, and vice versa.

G is the lever for throwing the gvides in or out of gear to shift the paddles, according to the direction of the turning of the wheel.

We do not intend to limit ourselves to the precise form or arrangement of the parts we claim to be new, but to vary them to suit different circumstances and wheels, as well as to suit the views of different constructions. For instance, we propose as one modification to dispense with the frame of the guides and connect with the guides arms arranged parallel with the axis of the shaft and fitted into boxes, so that they can slide in the direction of the shaft to bring either guide against the hub to shift the motion of the blades to suit the direction of the wheel's motion by two separate levers.

What we claim as our invention, and desire to secure by Letters Patent, is—

1. The bowing or arching of one, two, or more of the shanks of the paddles, so that they may pass through the hub and stand in the same transverse line with each other round the wheel, with the paddles on each end of each shank permanently at right angles to each other, whereby the great advantages above mentioned are attained and the wheel greatly simplified.

2. Giving to the shifting-guides a side motion just sufficient to disengage them from the projections of the paddles from one side of the hub and simultaneously engage them with projections on the other side of the hub, and vice versa, so as to effect the proper adjustment or shifting of the paddles, and whereby we dispense with the inconvenience of having to turn the frame around to the opposite side of the wheel to shift the guides.

THOMAS CHAMPION.
SAML. CHAMPION.

Witnesses:
T. C. DONN,
G. L. GIBERSON.